US008094409B2

(12) United States Patent
Feliss et al.

(10) Patent No.: US 8,094,409 B2
(45) Date of Patent: Jan. 10, 2012

(54) METHOD AND SYSTEM FOR MONITORING GAS IN SEALED HARD DISK DRIVES WITH FEEDBACK

(75) Inventors: Norbert A. Feliss, Aptos, CA (US); Karl A. Flechsig, Los Gatos, CA (US)

(73) Assignee: Hitachi Global Storage Technologies, Netherlands B.v., Amsterdam (NL)

( * ) Notice: Subject to any disclaimer, the term of this patent is extended or adjusted under 35 U.S.C. 154(b) by 809 days.

(21) Appl. No.: 12/128,512

(22) Filed: May 28, 2008

(65) Prior Publication Data

US 2009/0296271 A1 Dec. 3, 2009

(51) Int. Cl.
*G11B 33/14* (2006.01)
(52) U.S. Cl. .................................. 360/97.02; 360/97.03
(58) Field of Classification Search ..... 360/97.02–97.04
See application file for complete search history.

(56) References Cited

U.S. PATENT DOCUMENTS

| 5,229,899 | A | 7/1993 | Brown et al. |
| 6,144,178 | A | 11/2000 | Hirano et al. |
| 6,560,064 | B1 | 5/2003 | Hirano |
| 6,646,821 | B2 | 11/2003 | Bernett et al. |
| 6,683,747 | B2 | 1/2004 | Bernett |
| 6,819,517 | B2 * | 11/2004 | Fioravanti et al. ............... 360/75 |
| 7,062,387 | B1 | 6/2006 | Burns et al. |
| 7,212,370 | B1 | 5/2007 | Fukushima |
| 2003/0026033 | A1 | 2/2003 | Fioravanti et al. |
| 2007/0290391 | A1 * | 12/2007 | Kamo et al. ................... 264/104 |

FOREIGN PATENT DOCUMENTS

| EP | 1756831 | 11/2007 |
| JP | 61099834 | 5/1986 |
| JP | 63195893 | 8/1988 |

* cited by examiner

*Primary Examiner* — Allen Heinz

(57) ABSTRACT

A system and method for monitoring the helium content of a disk cavity of a hard disk drive is disclosed. In one embodiment of the present invention, an oxygen sensor is placed in the disk cavity to monitor the level of oxygen in the cavity. With the measurement of oxygen in the disk cavity, the level of helium in the cavity is inferred. In one embodiment, if the amount of helium inferred from the oxygen level fell below 90%-95% of the gaseous content of the disk cavity, a user is automatically notified in order to maintain the hard disk drive in a timely manner.

17 Claims, 4 Drawing Sheets

METHOD AND SYSTEM FOR MONITORING GAS IN SEALED HARD DISK DRIVES WITH FEEDBACK

TECHNICAL FIELD

The present invention relates to the field of data storage devices, and more particularly to an improved method and system for monitoring and providing feedback of the gas contents of a sealed drive.

BACKGROUND ART

Hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

A typical HDD uses the actuator assembly to move magnetic read/write heads to the desired location on the rotating disk so as to write information to or read from the location. Within most HDDs, the magnetic read/write head is mounted on a slider. The slider generally serves to mechanically support the head and any electrical connections between the head and the rest of the disk drive. The slider is aerodynamically shaped to establish an air lubrication film in order to maintain a uniform distance from the surface of the rotating disk, thereby preventing the head from undesirably contacting the disk.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is substantially proportional to the magnitude of the current. As the read/write head approaches a desired track, a reverse polarity signal is applied to the actuator, causing the signal to act as a brake, and ideally causing the read/write head to stop and settle directly over the desired track.

The reading or writing of data is performed in accordance with a write command and a read command transferred from a host system. The hard disk drive re-orders a command queue as one of the performance improving techniques. That is, the command queue of write commands and read commands transferred sequentially from the host system is re-ordered so that the latency required to execute the writing or reading command may be minimized.

Recently some disk drives are being filled with low-density gases other than air (i.e., helium) to enhance their performance. The lower density gas can reduce the aerodynamic drag between the disks and their read/write heads. This reduced drag can, in turn, reduce arm and suspension flutter and actuator buffeting. This reduced drag can also result in a reduction in power requirements for the spindle motor. The lower density gas also is more effective than air for conducting away heat generated during operation of the disk drive.

Unfortunately, in spite of the advantages associated with the low-density gas fill, these gas filled disk drives have associated problems that have impacted their commercial success. These problems include the leakage of the gas from the disk drives over time. Furthermore, since the gas molecules of helium are the smallest known to man other than hydrogen, the diffusion rate through solids is high and virtually impossible to achieve perfect sealing of the disk drive. But since fundamental performance of the disk file, such as magnetic fly-height, servo tracking following, depend on the environment being nearly pure helium (at least (90%-95%), a means of detecting the helium concentration before performance degradation becomes critical and highly desirable.

However, no low cost helium sensing and feedback solution exists today. Thus a low cost solution to monitor the helium content of seal disk files is highly desirable.

SUMMARY

In accordance with certain aspects of the present invention, the present invention provides a system and method for providing a helium or inert gas monitoring in a sealed disk file with a feedback system in order to provide a user a mechanism to save data prior to the degradation of the disk file. In one embodiment the gas monitoring system involves disposing an oxygen monitoring sensing system in the sealed disk file to periodically measure the oxygen content of the sealed file. By measuring the oxygen content of the sealed file, the level of the helium content is inferred by a predetermined threshold value of oxygen.

In one embodiment, the gas monitoring and feedback system includes a feedback notifier that notifies the use of the gradual degradation of the helium or inert gas contents of the sealed file in order to allow the user to save data in the disk file prior to total disk breakdown.

BEST MODES FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for sensing and monitoring gas content in a sealed disk file.

Overview

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly (as shown in FIG. 1) forms the primary motive mechanical system that enables a disk-drive to randomly access data to be written or recorded on the disk surfaces.

Figure 1:
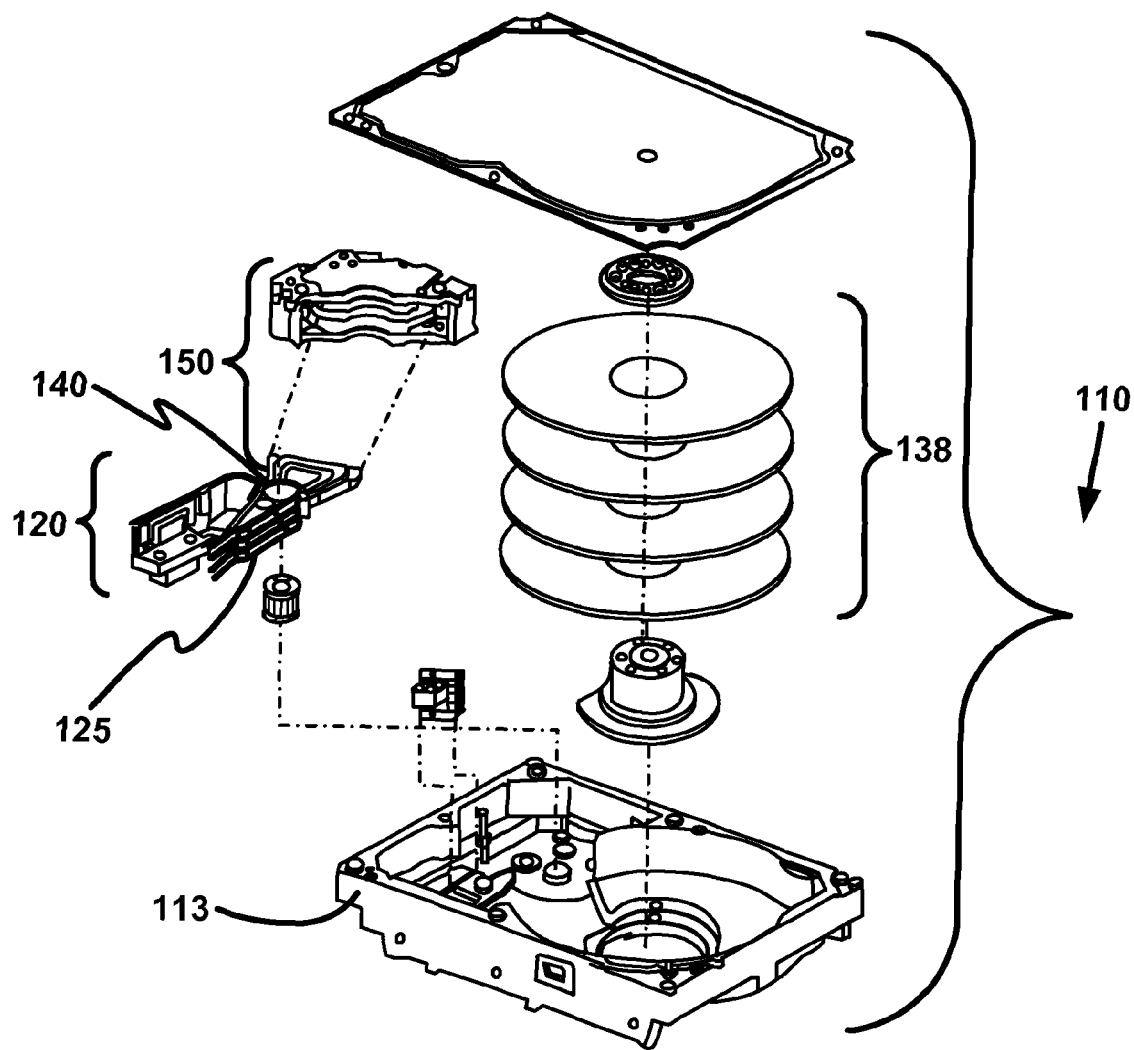
FIG. 1 is a plan view of an HDD with cover and top magnet removed with a serial identification label affixed to it in accordance with one embodiment of the present invention.

With reference now to FIG. 1 a schematic drawing of one embodiment of an information storage system including a magnetic hard disk file or drive 110 for a computer system is shown. Hard disk drive 110 has an outer housing or base 113 containing a disk pack having at least one medium or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the circumferential direction relative to housing 113. An actuator 120 includes a plurality of parallel actuator arms 125 in the form of a comb that is movably or pivotally mounted to base/housing 113 about a pivot assembly 145. A magnet assembly 150 is also mounted to base 113 for selectively moving the comb of arms relative to the disk pack (as represented by disk 138).

Figure 2:
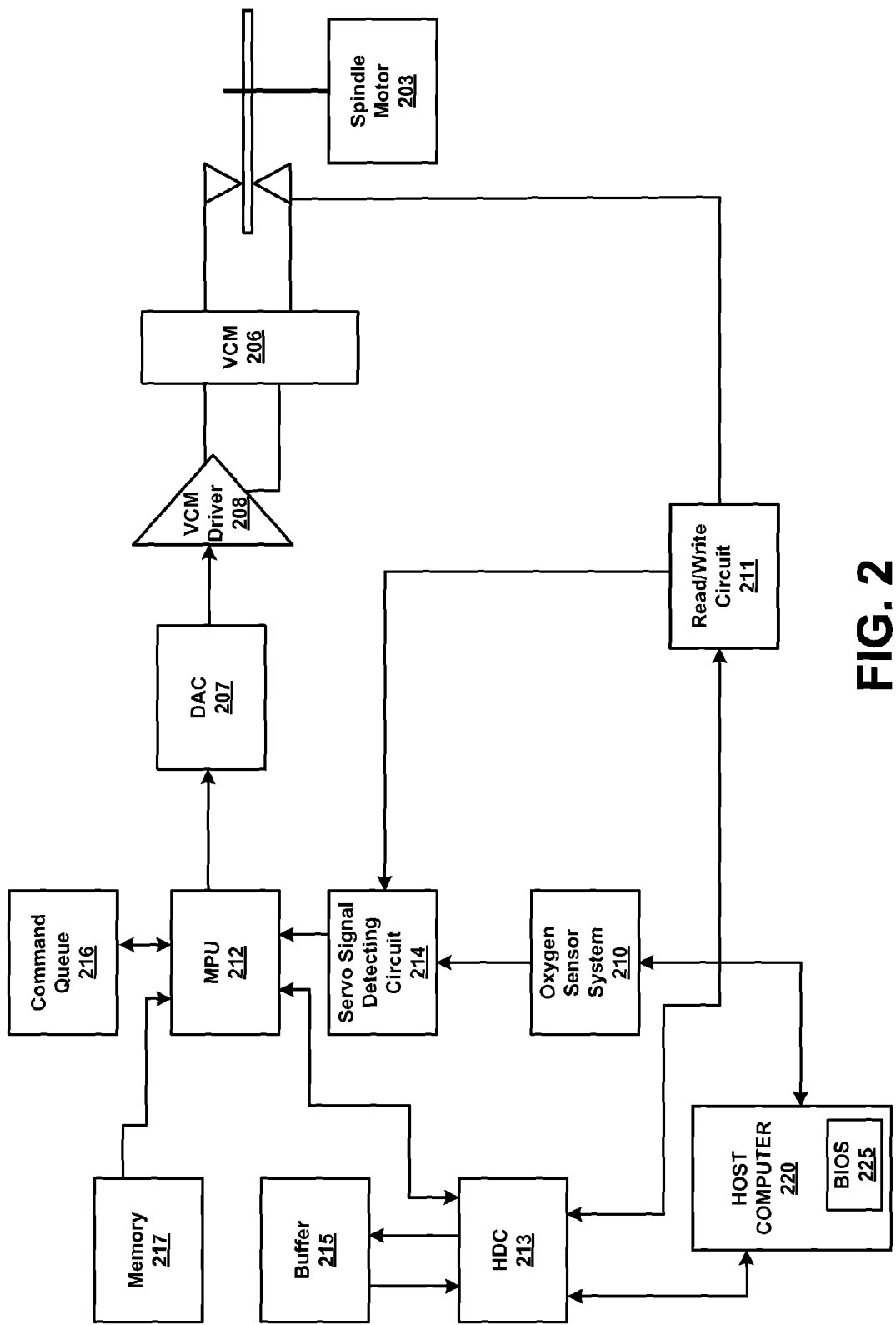
FIG. 2 is a block diagram illustrating a configuration of one embodiment of a hard disk drive in accordance with one embodiment of the present invention.

Referring now to FIG. 2 is a block diagram showing a principal portion of a hard disk drive 200 in accordance with one embodiment of the present invention. The Hard disk drive 200 is a data storing/reproducing unit for enabling a magnetic head 204 to seek on a magnetic disk 202 that is driven and rotated by a spindle motor 203 to be located in a predetermined track (position) and write the data into the magnetic disk 202 or read the data written in the magnetic disk 202. One or more magnetic disks 202 are mounted, as needed, but a single magnetic disk 202 is adopted in the embodiment.

The magnetic disk 202 is rotated around a spindle axis of the spindle motor 203, when the hard disk drive 200 is operated, and stopped when the hard disk drive 200 is inactive. A plurality of positional information (servo information) storage areas are formed radially on the surface of the magnetic disk 202 along a radial direction of the disk, and a data storage area is formed in the other region. The location of the magnetic disk 204 can be known by reading the servo information. The servo information is composed of track identification data and burst patterns.

The track identification information represents a track address of each data track. The magnetic head 204 reads this track information to determine a current track location of the magnetic head 204. A burst pattern consists of a plurality of rows of signal storing regions each having a different phase, which are arranged at a regular interval along a radial direction of the magnetic disk 202. The deviation amount of the magnetic head 204 off the data track can be determined on the basis of a signal output from the burst pattern.

The read/wrote circuit 211 performs the data reading/writing process. Namely, the write data transferred via an HDC (hard disk controller) 213 from a host computer 220 is converted into a write signal (electric current) and supplied to the magnetic head 204. The magnetic head 204 writes the data into the magnetic disk 202, on the basis of this write current. On the other hand, a read signal read from the magnetic disk 202 is converted into the digital data and output via the HDC 213 to the host computer 220.

A command queue 216 holds the write commands stored in buffer 215, or the order of executing the write command. This order of executing is determined by MPU 212 and the HDC 213. The write data or read data stored in the buffer 215 is written or read sequentially into or from the magnetic disk 202 in accordance with the executing order held in the command queue.

The hard disk drive 200 further comprises a gas monitoring and feedback system 210. The gas monitoring and feedback system 210 may be located anywhere in the sealed housing of the hard disk drive 200. In one embodiment, the gas monitoring and feedback system 210 couples to firmware of the hard disk drive to provide gas sensing data to the Self Monitoring Analysis and Reporting Technology (SMART) startup algorithm of the firmware. In one embodiment, the gas monitoring and feedback system 210 is coupled to the BIOS 225 of the operating system of the underlying host computer system 220 to allow the user to in real-time monitor the gas contents of the hard disk drive 200. In one embodiment, the gas monitoring and feedback system 210 is a low power semi-conductor and amplification system that has its own electronic unit and control apparatus with communication to the MPU 212.

Figure 3:
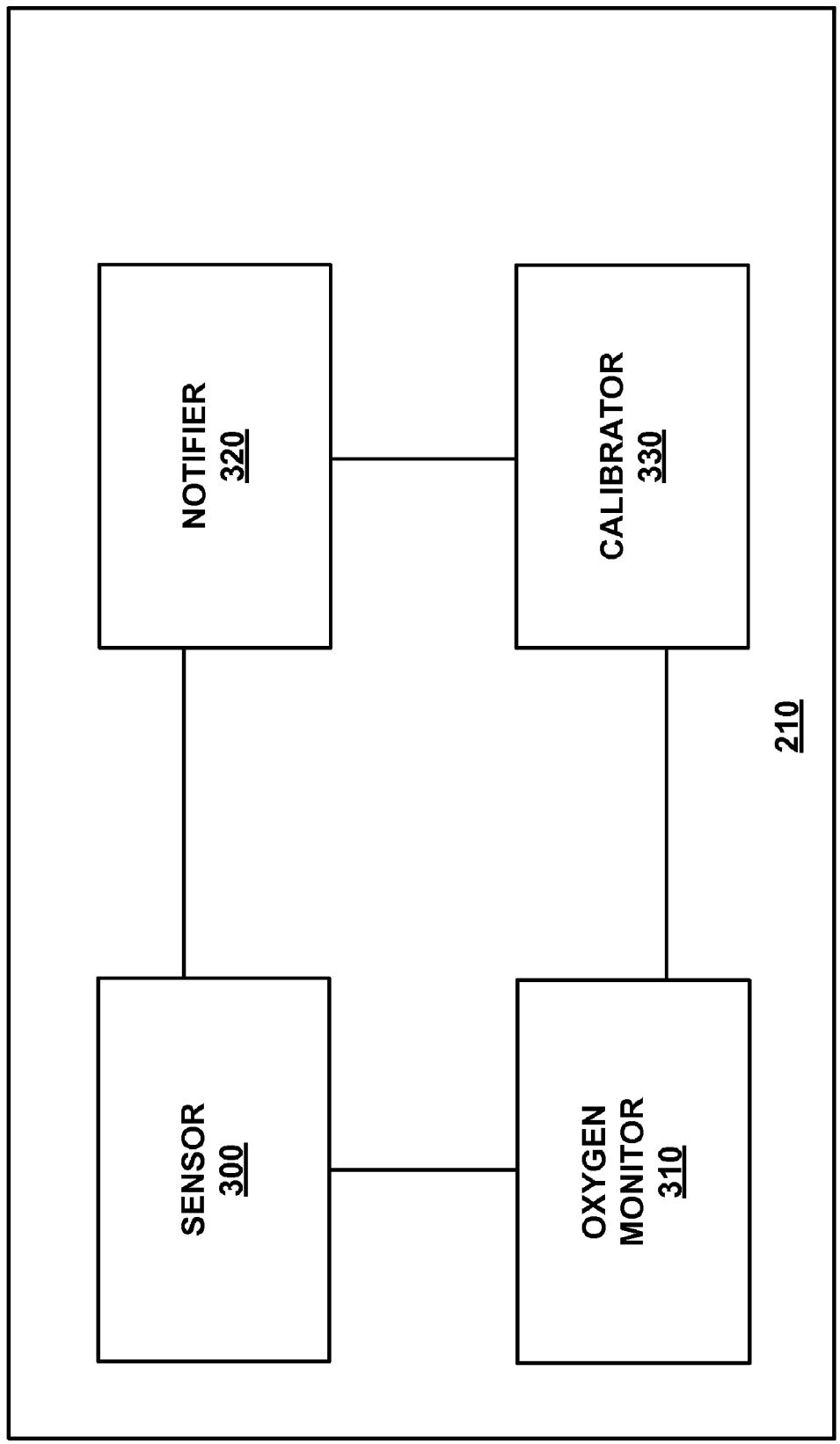
FIG. 3 is a diagram illustrating one embodiment of the gas monitoring and sensor system in accordance with one embodiment of the present invention.

FIG. 3 is a block diagram illustrating one embodiment of the gas monitoring and feedback system 210 in accordance to one embodiment of the present invention. As shown in FIG. 3, the gas monitoring and feedback system 310 comprises oxygen monitor 300, gas level sensor 310, gas level notifier 320 and gas level calibrator 320.

According to one embodiment of the present invention, the oxygen monitor 300 performs periodic measurement of the oxygen levels inside the sealed disk file. Since ambient air is approximately 20.9% oxygen, the amount of helium in a disk drive could be inferred from the oxygen concentration by a simple formula: helium %=(20.9%−oxygen %)/20.9%. If the amount of the helium or inert gas contents of the sealed disk file inferred from the measured oxygen level rises above a predetermined oxygen level threshold value (O2 at 8% or more), the drive user is notified by notifier 320 so that the drive can be maintained (e.g., conduct a helium purge) or replaced in a timely fashion. In one embodiment, the helium threshold value is 90-95% so the O2 content is 10% to 5%. However, the O2 threshold is relative to the inert gas that is inside the drive. With some inert gases the threshold changes in response to the optimum concentration of oxygen inside the drive. The optimum oxygen threshold values are subjective only and are not considered absolute. The oxygen threshold value can be easily changed by The User or the manufacturer.

In one embodiment, the oxygen content data sensing could be stored in RAM data of the hard disk drive and the information delivered to the SMART startup algorithm of the hard disk drive. In one embodiment, real time monitoring could be configured by the user via the BIOS settings in the operating system of the underly computer so that data can be displayed by the operating system. A error display message such as "LEAK DETECTED, PLEASE SAVE DATA AND SHUTDOWN" will allow some time for the user to save all primary data and have it backed up to another drive.

The calibrator 330 calibrates the oxygen level in the sealed disk file by comparing the predetermined oxygen levels with the real-time measurement of the oxygen levels in the sealed disk file provided by the oxygen monitor 300.

Figure 4:
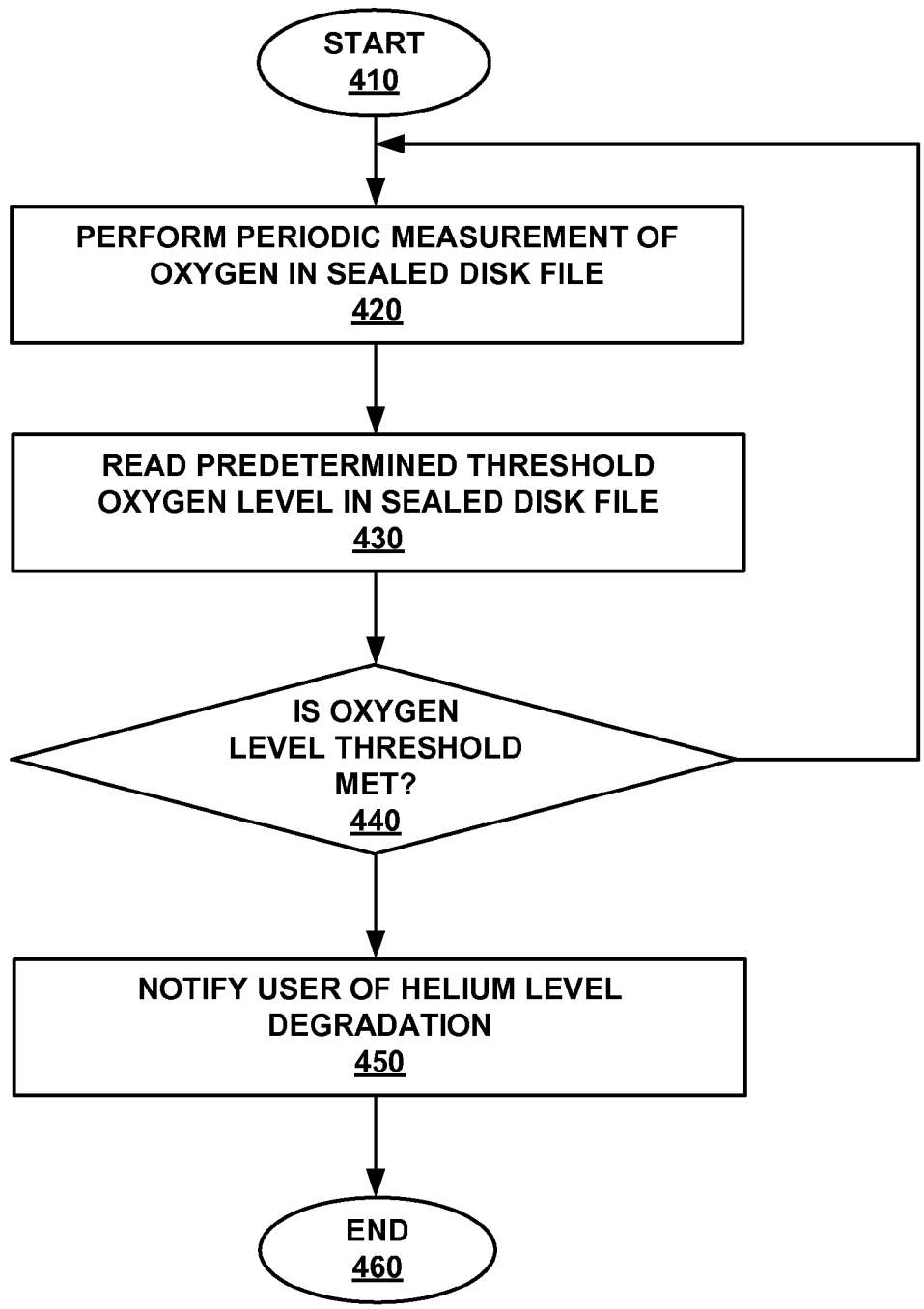
FIG. 4 is a flow chart of a method for monitoring the gas contents of the sealed disk in accordance with one embodiment of the present invention.

FIG. 4 is a flow chart illustrating one embodiment of the method for monitoring and providing feedback of the oxygen levels in a sealed disk file in accordance to one embodiment of the present invention.

During the manufacturing of helium filled disk drives, a series of tests are performed on the drives for quality assurance and to ensure that the helium does not leak out of the drives after the drives have been commercially sold. However, after the drives are sold, there is no meaningful way of monitoring the helium levels in the drive and to notify users when the helium level begin to degrade in a way to affect the performance of the drive.

The method illustrated in FIG. 4 provides a meaningful way of monitoring the helium content of the drive and to provide the user notice in enough time so as to allow the user to save data prior to any severe disk degradation.

As shown in FIG. 4, the method 400 performs periodic measurements of the oxygen content of the hermetically sealed hard disk drive at step 420. The oxygen measurement, in one embodiment, provides a meaningful way of inferring the helium levels in the hard disk drive.

At step 430, method 400 reads a predetermined threshold value of the oxygen content of the hard disk drive. The threshold value provides a benchmark for determining the acceptable or adequate level of helium in the drive.

At step 440, method 400 compares the periodic oxygen measurement taken at step 420 and compares the value of that measurement with the value of the predetermined oxygen level in step 430 to determine whether the periodic oxygen measurement value is equal to or rises above the predetermined threshold value of 8%. If the periodic oxygen level measurement taken in step 420 is equal to or rises above the predetermined threshold value in step 430, then the helium content of the hard disk drive is deemed inadequate or unacceptable and the user is notified.

If on the other hand, the value of the periodic oxygen measurement taken in step 420 does not meet or rises above the predetermined threshold value in step 430, the method 400 continues monitoring the oxygen content of the hard disk drive.

Thus, embodiments of the present invention provide a method and apparatus for monitoring the helium or inert gas content of a hard disk drive by periodically measuring the oxygen content of the hard disk drive. A threshold value of the oxygen content of the hard disk drive allows the level of the helium or inert gas in the hard disk drive to be inferred.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hard disk drive comprising:
   a sealed housing containing a non-air low-density gas;
   a plurality of storage media into which data is accessed;
   a plurality of read/write heads for writing to and reading from the plurality of storage media;
   an oxygen sensing system disposed within the sealed housing for determining the level of the non-air gas in the sealed housing,
   wherein said oxygen sensing system can be located anywhere in the sealed housing and wherein if a determined level of non-air gas falls below approximately 90%-95% of a predetermined threshold value of the sensed oxygen content of the sealed housing, the level of the non-air gas is deemed inadequate.

2. The hard disk drive of claim 1, wherein the oxygen sensing system comprises a data feedback module for providing feedback data to a user monitoring the oxygen level in the sealed housing.

3. The hard disk drive of claim 2, wherein the oxygen sensing system further comprises a gas detector for detecting oxygen levels in the sealed housing.

4. The hard disk drive of claim 3, wherein the oxygen sensing system further comprises oxygen monitor for periodically measuring the oxygen levels in the sealed housing, wherein if a power consumption preference is set low, command selection preference is given to the accompanying command.

5. The hard disk drive of claim 4, wherein the oxygen sensing system further comprises a notifier for notifying a user of low level of the non-air gas in the sealed housing wherein as a dynamically adjustable knob increases, more emphasis is given to power consumed by a particular command being written or being read over an expected access time of the particular command being written or being read.

6. The hard disk drive of claim 5, wherein the oxygen sensing system further comprises data calibrator for comparing the non-air gas level with a predetermined threshold value of the oxygen present in the sealed housing.

7. The hard disk drive of claim 6, wherein the non-air gas is helium wherein a plurality of aerodynamic annuli suppresses an air flow layer at a pressure variance at a mid-disk monitor point of approximately 1 mm inward from peripheral ends of a plurality of disks by a factor of three.

8. The hard disk drive of claim 7, wherein the non-air gas is an inert gas.

9. A method of monitoring and providing feedback of gas fill in a hard disk drive, the method, comprising: providing
   a plurality of storage media disks;
   providing a plurality of heads for accessing commands written to or read from the plurality of storage media disks;
   hermetically sealing the plurality of storage media disks in a disk housing;
   filling a cavity of the disk housing with helium for improving performance of the plurality of storage media disks;
   providing an oxygen sensing monitor in the cavity for monitoring the level of oxygen gas to infer the level of the helium in the disk housing; coupling the oxygen sensor to a BIOS of an operating system of a host computer system of the hard disk drive to allow real time monitoring of helium in the hard disk drive; and
   setting a predetermined threshold value of the oxygen gas for which the level of the helium gas is inadequate, wherein if the level of the helium gas in the housing is deemed inadequate, a user is automatically notified of the degradation of the helium gas in the housing.

10. A data storage device comprising:
    a hermetically sealed housing having a plurality of storage media forming a disk file and containing a non-air low-density gas;

a plurality of read/write heads for writing to and reading from the plurality of storage media; and an oxygen sensing system disposed within the sealed housing for determining the level of the non-air gas in the sealed housing, said oxygen sensing system can be located anywhere in the sealed housing and wherein if a determined level of non-air gas falls below approximately 90%-95% of a predetermined threshold value of the sensed oxygen content of the sealed housing, the level of the non-air gas is deemed inadequate.

11. The data storage device of claim 10, wherein the oxygen sensing system comprises a data feedback module for providing feedback data to a user monitoring the oxygen level in the sealed housing.

12. The data storage device of claim 11, wherein the oxygen sensing system further comprises a gas detector for detecting oxygen levels in the sealed housing.

13. The data storage device of claim 12, wherein the oxygen sensing system further comprises oxygen monitor for periodically measuring the oxygen levels in the sealed housing.

14. The data storage device of claim 13, wherein the oxygen sensing system further comprises a notifier for notifying said user of low level of the non-air gas in the sealed housing.

15. The data storage device of claim 10, wherein the non-air gas is helium.

16. The data storage device of claim 10, wherein the non-air gas is an inert gas.

17. The data storage device of claim 10, wherein the threshold value can be adjusted by a user or by a manufacturer based upon the user's request.

* * * * *